United States Patent Office 3,389,141
Patented June 18, 1968

3,389,141
1-β-ARYLOXYETHYLTETRAHYDRO-
ISOQUINOLINES
Thomas A. Montzka, Manlius, N.Y., assignor to Bristol-
Myers Company, New York, N.Y., a corporation of
Delaware
No Drawing. Filed May 16, 1966, Ser. No. 550,151
12 Claims. (Cl. 260—286)

ABSTRACT OF THE DISCLOSURE

1-β-aryloxyethyl-2-methyl-6,7-dimethoxy - 1,2,3,4-tetra-hydroisoquinolines, wherein aryl is substituted or unsubstituted phenyl, pyrrolyl, pyridyl, thiazolyl or thienyl are useful as analgesic agents.

This invention relates to a novel series of basic chemicals and their acid addition salts which are useful analgesic agents and, more particularly, to certain substituted 1-β-aryloxyethyl-2-methyl-6,7 - dimethoxy-1,2,3,4-tetrahydroisoquinolines.

There is provided by the present invention a member selected from the group consisting of compounds of the formula

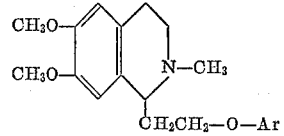

wherein Ar is a member selected from the group consisting of

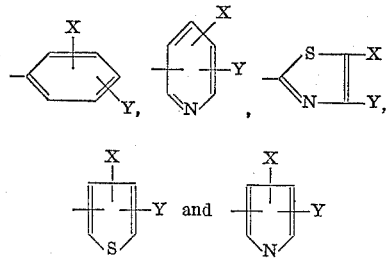

wherein X and Y are each a member selected from the group consisting of hydrogen, chloro, bromo, fluoro, trifluoromethyl, nitro (lower)alkyl and (lower)alkoxy; and nontoxic pharmaceutically acceptable acid addition salts thereof.

The preferred embodiments of the present invention are the compounds of the formula

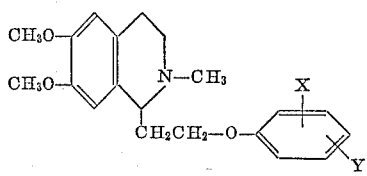

wherein X and Y have the meaning set forth above and their nontoxic pharmaceutically acceptable salts and, particularly, the two compounds (and their salts) of the formula

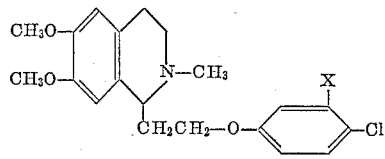

wherein X is hydrogen or chloro, which are exceptionally effective analgesic agents.

Included within the present invention are the acid addition salts prepared by reaction of these basic compounds with organic and inorganic acids such as hydrochloric acid, hydrobromic acid, sulfuric acid, phosphoric acid, acetic acid, maleic acid, tartaric acid, citric acid, sulfamic acid, glycolic acid, succinic acid, ascorbic acid and the like.

The term "(lower)alkyl" as used herein refers to straight and branched chain saturated monovalent aliphatic hydrocarbon radicals having from one to ten carbon atoms inclusive, e.g. methyl, ethyl, propyl, isopropyl, butyl, normal and secondary and tertiary butyl, amyl, decyl, etc.

The compounds of the present invention are prepared as shown schematically below by reacting the appropriate β-aryloxypropionic acid or acid halide such as the acid chloride, with 3,4-dimethoxyphenethylamine to form the amide, cyclizing the amide, as with phosphoryl chloride, to the 1-substituted-dihydroisoquinoline, reducing the last, as with a borohydride, to the corresponding tetrahydroisoquinoline and finally methylating at the 2-position, thus:

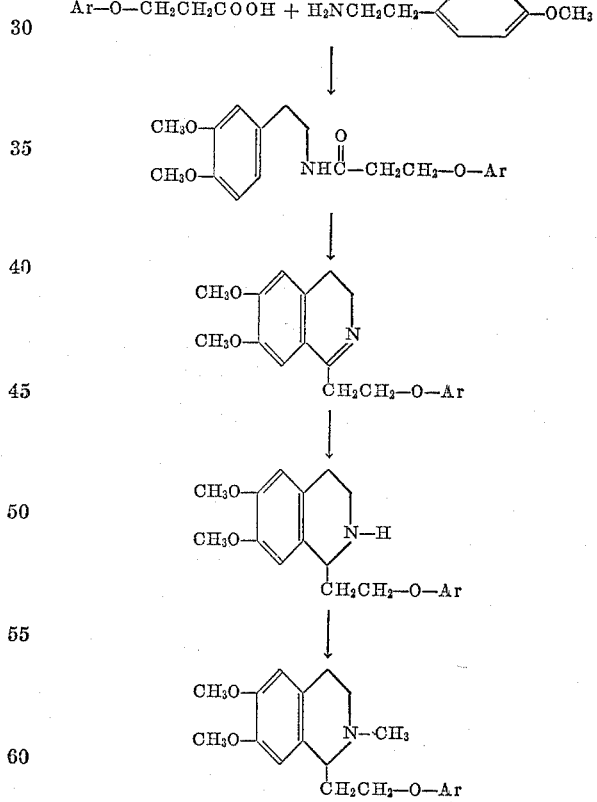

An alternate procedure as exemplified below follows the scheme:

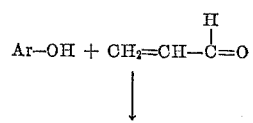

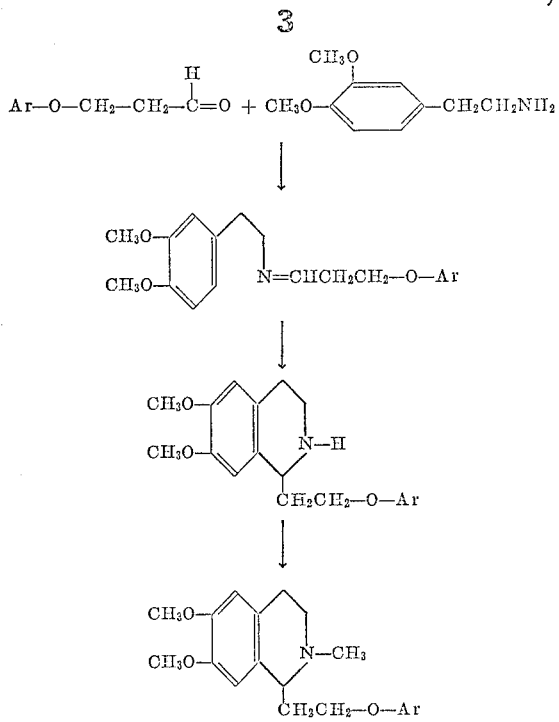

Thus the starting β-aryloxypropionic acids or acid halides and the alternative starting β-aryloxypropionaldehydes may be prepared by the methods reported in the literature.

The β-aryloxypropionic acids or acid halides are used to acylate 3,4-dimethoxyphenethylamine in the normal manner and the amide so produced is cyclized as with oxides or chlorides of phosphorus and reduced as with alkali metal metal aluminum hydride or borohydride to the tetrahydroisoquinoline or in accordance with the procedures on pages 250 and 254 of volume IV, Richter, The Chemistry of Carbon Compounds, Elsevier Publishing Co., Inc., New York, New York, 1947, and on pages 347–353 of volume IV, Elderfield, Heterocyclic Compounds, Wiley, New York, New York, 1952, and United States Patent No. 2,683,146 and Great Britain Patent No. 926,493.

The tetrahydroisoquinoline is then methylated in the 2-position by the usual techniques used to methylate aliphatic secondary amines, e.g. with formic acid and formaldehyde. Thus, the introduction of the methyl group may be carried out according to known methods, for example, by treating the starting material, i.e., the 1,6,7-trisubstituted-1,2,3,4-tetrahydroisoquinoline, with a one-molar equivalent of a reactive ester of methanol. A reactive ester of methanol is particularly one formed with a strong inorganic acid, e.g. hydrochloric, hydrobromic, hydriodic, sulfuric and the like, or a strong organic sulfonic acid, e.g. methane sulfonic, ethane sulfonic, 2-hydroxyethane sulfonic, p-toluene sulfonic acid and the like; reactive esters are therefore, for example, the methyl halides, e.g. chloride, bromide, or iodide, dimethyl sulfate and methyl p-toluene sulfonate and the like. The reactive ester is preferably reacted with the starting material in the form of a metal compound, particularly of an alkali metal, e.g. lithium, sodium and the like compound; the latter is prepared by treatment with a suitable reagent capable of forming such compound, for example, with an alkali metal hydride, e.g. sodium hydride and the like, or any other equivalent reagent. The formation of the metal compound, as well as the treatment of the latter with the reactive ester is preferably carried out in the presence of a suitable inert solvent, if necessary, while cooling or at an elevated temperature and/or in a closed vessel and/or in the atmosphere of an inert gas, e.g., nitrogen.

The methyl group may also be introduced according to other methods, for example, by treating the 1,6,7-trisubstituted-1,2,3,4-tetrahydroisoquinoline starting material with formaldehyde in the presence of a reducing agent, e.g. formic acid, hydrogen in the presence of a hydrogenation catalyst, e.g. palladium and the like, or any other suitable reducing reagent.

In another and very valuable procedure the compounds of the present invention are prepared by the reaction of a compound of the formula H—O—Ar wherein Ar is as defined above (and preferably a metal salt thereof, such as the sodium or potassium salt) with a reagent of the formula

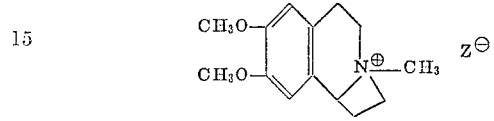

wherein $Z^\ominus$ represents one equivalent of an inert anion. The preferred anions include the halides (chloride, bromide and iodide), sulfate, (lower)alkyl sulfate and sulfonates, such as p-toluenesulfonate and p-bromobenzenesulfonate, but other anions are equally useful and need not even be nontoxic as the anion does not appear in the final pharmaceutical product prepared by reaction of this reagent with, for example, a compound of the formula Ar—O—Na as illustrated in Example 1 below.

These intermediate quaternary salts are prepared, in one procedure, by the treatment with alkali, e.g. $Na_2CO_3$, of the reaction product of the alcohol of the formula

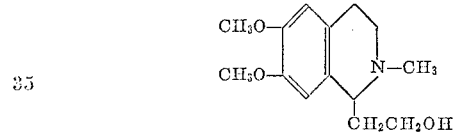

with $SOCl_2$, $SOBr_2$ $(CH_3)_2SO_4$, p-$CH_3C_6H_4SO_2Cl$, p-$BrC_6H_4SO_2Cl$ or the like. The anion $Z^\ominus$ is of little consequence in such active intermediates since the chemical reactivity resides in the cation. The anion $Z^\ominus$ is defined as an inert anion to exclude unusual anions containing additional substituents, such as phenolic hydroxyl groups, capable of further reaction with these quaternary salts. As thus prepared, $Z^\ominus$ may be chloride, bromide, methanesulfonate, ethanesulfonate, p-toluenesulfonate, p-bromobenzenesulfonate or the like. By exchange reactions of the conventional type, $Z^\ominus$ can be replaced by other anions, e.g. phosphate, fluoride, malate, succinate, fumarate, oleate, etc. The salts obtained through these variations of $Z^\ominus$ may in some cases have special advantages due to solubility, ease of crystallization, etc. but these are all subsidiary to the chemical reactivity of the compound which is independent of the character of $Z^\ominus$.

In a preferred embodiment, the compounds of the present invention are prepared by the reaction of a compound of the formula Ar—O—H wherein Ar is as defined above (and preferably a metal salt thereof, such as the sodium or potassium salt) with a reagent of the formula

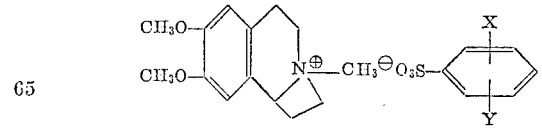

wherein X and Y are each hydrogen, chloro, bromo, fluoro, trifluoromethyl, nitro (lower)alkyl or (lower)alkoxy. This reaction is preferably conducted in an inert, organic solvent, e.g., dimethylformamide, at a temperature from 20° C. to 100° C.

The preparation of this reagent is illustrated for the case where X is hydrogen and Y is para-bromo as follows:

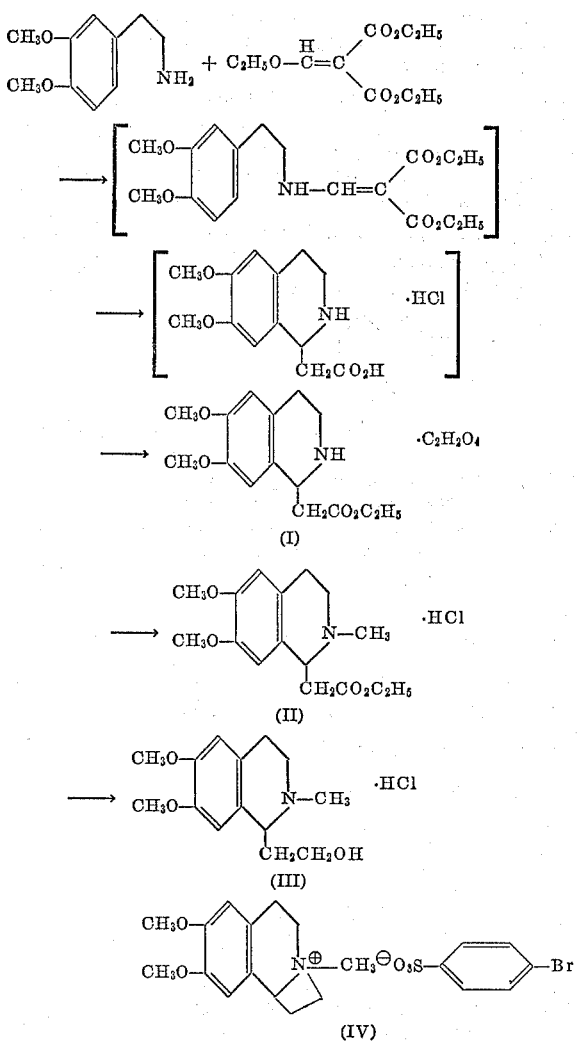

6,7 - dimethoxy-1,2,3,4-tetrahydroisoquinoline-1-acetic acid ethyl ester oxalate (1) [A. L. Bluhm and W. J. Gensler, J. Org. Chem., 21, 336–339 (1956)].—To a stirred solution of 216.9 g. (1 mole) distilled diethyl ethoxymethylenemalonate in 1 liter of absolute ethanol was added slowly 181.2 g. (1 mole) of distilled homoveratrylamine in a nitrogen atmosphere. The reaction mixture was stirred for 16 hours at room temperature and then concentrated to dryness. The resultant oil was taken up in 2 liters of 24% hydrochloric acid, heated on a steam bath for 4 hours and then concentrated to dryness to give a yellow oil. This oil was taken up in 1 liter of absolute ethanol, filtered to remove insoluble material, saturated with gaseous hydrogen chloride with cooling, stored at room temperature for one day and then concentrated to dryness to give an oil. This was retaken up in one liter of absolute ethanol, saturated with gaseous hydrogen chloride with cooling, stored at room temperature for one day and again concentrated to dryness. The resultant brown oil was basified with aqueous sodium carbonate, extracted with chloroform, dried over sodium sulfate, and concentrated to an oil which gave a crystalline oxalate with 90 g. of oxalic acid from acetone. One recrystallization from 95% ethanol yielded 228.1 g. (61.7%) of 6,7 - dimethoxy - 1,2,3,4-tetrahydroisoquinoline-1-acetic acid ethyl ester oxalate. Several recrystallizations from 95% ethanol gave an analytical sample M.P. 136–164° C. (poorly defined).

Analysis.—Calc'd for $C_{15}H_{21}NO_4 \cdot C_2H_2O_4$: C, 55.28; H, 6.26; N, 3.79. Found: C, 55.28; H, 6.25; N, 3.81.

6,7 - dimethoxy - 2-methyl-1,2,3,4-tetrahydroisoquinoline-1-acetic acid ethyl ester hydrochloride (II) [A. Brossi et al., Helv. Chim. Acta, 43, 583–593 (1960)].—To 3.8 g. (0.0135 mole) of 6,7-dimethoxy-1,2,3,4-tetrahydroisoquinoline-1-acetic acid ethyl ester, obtained from the oxalate by neutralization with sodium carbonate, was added 1.2 ml. of 40% formaldehyde and 3.6 ml. of 88% formic acid. The reaction mixture was heated on a steam bath for 2 hours. Three ml. of 6 N hydrochloric acid were added and the solution was concentrated to dryness to yield 4.5 g. (100%) of crude crystalline 6,7-dimethoxy-2 - methyl - 1,2,3,4-tetrahydroisoquinoline-1-acetic acid ethyl ester hydrochloride. One recrystallization from absolute ethanol gave analytical material, M.P. 179–183° C.

Analysis.—Calc'd for $C_{16}H_{23}NO_4 \cdot HCl$: C, 58.26; H, 7.34; N, 4.25. Found: C, 58.36; H, 7.38; N, 4.32.

6,7 - dimethoxy - 1 - β-hydroxyethyl-2-methyl-1,2,3,4-tetrahydroisoquinoline hydrochloride (III).—To a stirred suspension of 7.6 g. (0.2 mole) of lithium aluminum hydride in 100 ml. of tetrahydrofuran was added slowly 58.5 g. (0.2 mole) of 6,7-dimethoxy-2-methyl-1,2,3,4-tetrahydroisoquinoline-1-acetic acid ethyl ester (obtained from the hydrochloride by neutralization with sodium carbonate) in 150 ml. of tetrahydrofuran. The suspension was refluxed for 4 hours. Twenty-five ml. of water were cautiously added and the suspension was stirred with warming until white. Anhydrous sodium sulfate was added and the solids removed by filtration. The filtrate was concentrated to dryness to give 49.9 g. (99.3%) of an oil which gave crystalline 6,7-dimethoxy-1-β-hydroxyethyl - 2-methyl - 1,2,3,4 - tetrahydroisoquinoline hydrochloride from acetone. One recrystallization from absolute ethanol yielded 42.6 g. of analytical material, M.P. 179–182° C.

Analysis.—Calc'd for $C_{14}H_{21}NO_3 \cdot HCl$: C, 58.43; H, 7.71; N, 4.87. Found: C, 58.26; H, 7.88; N, 4.77.

[2,1 - a]azetidino-6,7-dimethoxy-2-methyl-1,2,3,4-tetrahydroisoquinolinium p-bromobenzenesulfonate (IV).—To a stirred solution at room temperature of 5.3 g. (.021 mole) of 6,7-dimethoxy-1-β-hydroxyethyl-2-methyl-1,2,3,4-tetrahydroisoquinoline (obtained from the hydrochloride by neutralization with sodium carbonate) in 100 ml. of chloroform was added 5.5 g. (.0216 mole) of p-bromobenzenesulfonyl chloride. Stirring was continued for 4 hours. Anhydrous sodium carbonate (11.2 g.) was added and stirring was continued for 16 hours. The mixture was filtered and the filtrate concentrated to give 9.6 g. (97%) of crude crystalline material. Several recrystallizations from isopropanol yielded analytically pure [2,1-a]azetidino - 6,7 - dimethoxy - 2 - methyl-1,2,3,4-tetrahydroisoquinolinium p-bromobenzenesulfonate, M.P. 182–184.5° C.

Analysis.—Calc'd for $C_{20}H_{24}BrNO_5S$: C, 51.07; H, 5.14; N, 2.98. Found: C, 51.01; H, 5.29; N, 2.92.

As its hydrochloride salt, the preferred compound of the present invention has the structure

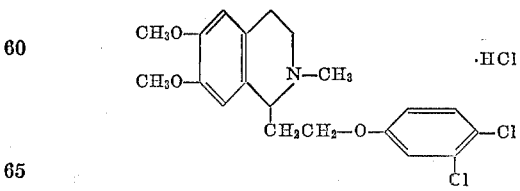

and may be named 1-(3,4-dichlorophenoxyethyl)-6,7-dimethoxy - 2-methyl-1,2,3,4-tetrahydroisoquinoline hydrochloride or 1 - [β - (3,4-dichlorophenoxy)ethyl]-6,7-dimethoxy - 2-methyl-1,2,3,4-tetrahydroisoquinoline hydrochloride. This compound was tested for analgesic activity by the phenylquinone test of Sigmund et al., Proc. Soc. Expt'l. Biol. and Med., 95, 729 (1957) in which an analgesic reduces the induced writhing of the mice. At dosages of 100 and 50 mgm./kg. p.o. in mice given 50 minutes before the phenyl-p-quinone is injected, the reduction in induced writhing at the end of the first hour was found to be 100% and 62% respectively for this compound. This compound was also shown to be a potent analgesic by the standard rat-tail flick test.

The following examples will serve to illustrate the present invention without limiting it thereto.

Example 1.—Preparation of 1-(β-3,4-dichlorophenoxyethyl) - 6,7, - dimethoxy - 2 - methyl - 1,2,3,4 - tetrahydroisoquinoline hydrochloride

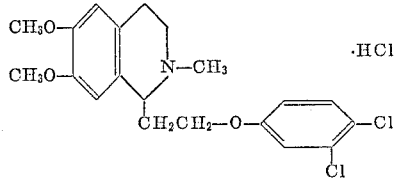

To a stirred solution of 1.37 g. (0.0084 mole) 3,4-dichlorophenol in 25 ml. of dried dimethylformamide maintained in a nitrogen atmosphere was added 0.38 g. (0.0092 mole) of a 58.6% dispersion of sodium hydride in mineral oil. After stirring for 15 minutes, 3.6 g. (0.0076 mole) of [2,1 - a]azetidino - 6,7 - dimethoxy - 2 - methyl-1,2,3,4 - tetrahydroisoquinolinium p-bromobenzenesulfonate was added. Stirring at room temperature was continued for 20 hours. This solution was concentrated to dryness under vacuum. The residue was dissolved in water and extracted 3 times with ethyl acetate. These extracts were dried over anhydrous magnesium sulfate, filtered, and concentrated to give an oil. This oil was taken up in acetonitrile, washed with n-pentane to remove mineral oil, and concentrated to give 3.0 g. of a clear oil which gave a crystalline hydrochloride from acetone-dry hydrogen chloride. One recrystallization from isopropanol yielded 2.7 g. (82%) of white crystalline material, 1-(β-3,4 - dichlorophenoxyethyl) - 6,7 - dimethoxy - 2 - methyl-1,2,3,4 - tetrahydroisoquinoline hydrochloride, M.P. 171.5–174.0° C.

*Analysis.*—Calc'd for $C_{20}H_{23}Cl_2NO_3 \cdot HCl$: C, 55.50; H, 5.59; N, 3.28. Found: C, 55.76; H, 5.73; N, 3.33.

By similar procedures, the compounds of the following Examples 2 through 11 were prepared in the indicated amounts and with the properties stated.

Example 2.—Preparation of 1-(β-4-chlorophenoxyethyl)-6,7 - dimethoxy - 2 - methyl - 1,2,3,4 - tetrahydroisoquinoline hydrochloride

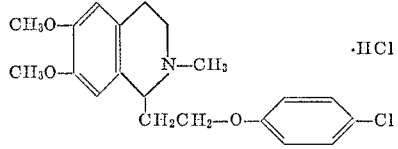

0.38 g. (0.0092 mole) sodium hydride
1.05 g. (0.0084 mole) p-chlorophenol
3.6 g. (0.0076 mole) [2,1-a]azetidino-6,7-dimethoxy-2-methyl - 1,2,3,4 - tetrahydroisoquinolinium p - bromobenzenesulfonate yielded 1.8 g. (60%) 1 - (β - 4-chlorophenoxyethyl)-6,7-dimethoxy - 2 - methyl - 1,2,3,4 - tetrahydroisoquinoline hydrochloride from absolute ethanol, M.P. 190–194° C.

*Analysis.*—Calc'd for $C_{20}H_{24}ClNO_3 \cdot HCl$: C, 60.30; H, 6.33; N, 3.52. Found: C, 60.03; H, 6.42; N, 3.44.

Example 3.—Preparation of 6,7-dimethoxy-2-methyl-1-(β - phenoxy - ethyl) - 1,2,3,4 - tetrahydroisoquinoline hydrochloride

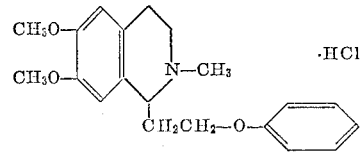

0.38 g. (0.0092 mole) sodium hydride
0.79 g. (0.0084 mole) phenol
3.6 g. (0.0076 mole) [2,1-a]azetidino-6,7-dimethoxy-2-methyl - 1,2,3,4 - tertahydroisoquinolinium - p - bromobenzenesulfonate yielded 1.4 g. (52%) 6,7-dimethoxy-2-methyl-1-(β-phenoxyethyl) - 1,2,3,4-tetrahydroisoquinoline hydrochloride from isopropanol, M.P. 181–184° C.

*Analysis.*—Calc'd for $C_{20}H_{25}NO_3 \cdot HCl$: C, 66.01; H, 7.20; N, 3.85. Found: C, 66.01; H, 7.29; N, 3.83.

Example 4.—Preparation of 6,7-dimethoxy - 1 - (β-p-methoxyphenoxyethyl) - 2 - methyl - 1,2,3,4 - tetrahydroisoquinoline hydrochloride

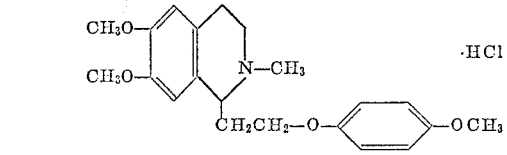

0.38 g. (0.0092 mole) sodium hydride
1.04 g. (0.0084 mole) 4-methoxyphenol
3.6 g. (0.0076 mole) [2,1-a]azetidino-6,7-dimethoxy-2-methyl - 1,2,3,4 - tetrahydroisoquinolinium p - bromobenzenesulfonate yielded 2.1 g. (70%) 6,7-dimethoxy - 1 - (β-p-methoxyphenoxyethyl) - 2 - methyl-1,2,3,4-tetrahydroisoquinoline hydrochloride from absolute ethanol M.P. 178–181.5° C.

*Analysis.*—Calc'd for $C_{21}H_{27}NO_4 \cdot HCl$: C, 64.03; H, 7.16; N, 3.56. Found: C, 64.27; H, 7.29; N, 3.63.

Example 5.—Preparation of 6,7-dimethoxy-2-methyl-1-(β - p-trifluoromethylphenoxyethyl)-1,2,3,4-tetrahydroisoquinoline hydrochloride

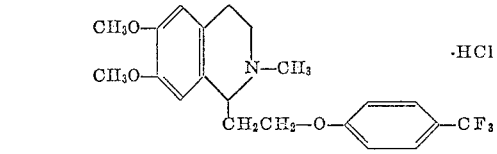

0.38 g. (0.0092 mole) sodium hydride
1.35 g. (0.0084 mole) p-trifluoromethylphenol
3.6 g. (0.0076 mole) [2,1-a]azetidino - 6,7 - dimethoxy-2-methyl - 1,2,3,4-tetrahydroisoquinolinium p - bromobenzenesulfonate yielded 2.4 g. (73.5%) of 6,7-dimethoxy-2-methyl-1-(β-p - trifluoromethylphenoxyethyl) - 1,2,3,4 - tetrahydroisoquinoline hydrochloride from 95% ethanol, M.P. 199–206° C.

*Analysis.*—Calc'd for $C_{21}H_{24}F_3NO_3 \cdot HCl$: C, 58.53; H, 5.61; N, 3.25. Found: C, 58.25; H, 5.90; N, 3.29.

Example 6.—Preparation of 1-(β-2,6-dichlorophenoxyethyl) - 6,7 - dimethoxy - 2 - methyl-1,2,3,4-tetrahydroisoquinoline hydrochloride

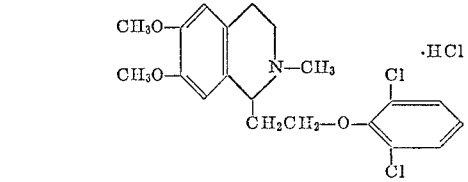

0.38 g. (0.0092 mole) sodium hydride
1.37 g. (0.0084 mole) 2,6-dichlorophenol
3.6 g. (0.0076 mole) [2,1-a]azetidino-6,7-dimethoxy-2-methyl - 1,2,3,4 - tetrahydroisoquinolinium p - bromobenzenesulfonate yielded 2.7 g. (82.4%) of 1-(β-2,6-dichlorophenoxyethyl) - 6,7 - dimethoxy - 2-methyl-1,2,3,4-tetrahydroisoquinoline hydrochloride from 95% ethanol, M.P. 185–188° C.

*Analysis.*—Calc'd for $C_{20}H_{23}Cl_2NO_3 \cdot HCl$: C, 55.50; H, 5.59; N, 3.24. Found: C, 55.48; H, 5.66; N, 3.07.

Example 7.—Preparation of 1 - (β - m - chlorophenoxyethyl) - 6,7 - dimethoxy-2-methyl-1,2,3,4-tetrahydroisoquinoline hydrochloride

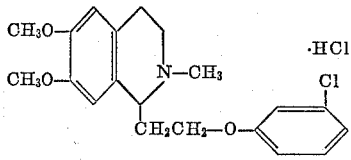

0.38 g. (0.0092 mole) sodium hydride
1.07 g. (0.0084 mole) m-chlorophenol
3.6 g. (0.0076 mole) [2,1-a]azetidino-6,7-dimethoxy-2-methyl - 1,2,3,4 - tetrahydroisoquinolinium p - bromobenzenesulfonate yielded 1.7 g. (56.8%) of 1-(β-m-chlorophenoxyethyl)-6,7 - dimethoxy - 2-methyl-1,2,3,4-tetrahydroisoquinoline hydrochloride from 95% ethanol, M.P. 177–182° C.

*Analysis.*—Calc'd for $C_{20}H_{24}ClNO_3 \cdot HCl$: C, 60.30; H, 6.33; N, 3.52. Found: C, 60.55; H, 6.44; N, 3.45.

Example 8.—Preparation of 6,7-dimethoxy-1-(β-p-fluorophenoxyethyl) - 2-methyl-1,2,3,4-tetrahydroisoquinoline hydrochloride hemiethanolate

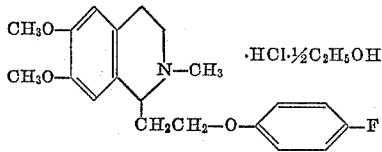

0.38 g. (0.0092 mole) sodium hydride
0.94 g. (0.0084 mole) p-fluorophenol
3.6 g. (0.0076 mole) [2-1-a]azetidino-6,7-dimethoxy-2-methyl - 1,2,3,4 - tetrahydroisoquinolinium p - bromobenzenesulfonate yielded 1.8 g. (62%) of 6,7-dimethoxy-1-(β-p-fluorophenoxyethyl) - 2 - methyl - 1,2,3,4 - tetrahydroisoquinoline hydrochloride hemiethanate from 95% ethanol, M.P. 177.5–187.5° C.

*Analysis.*—Calc'd for $C_{20}H_{24}FNO_3 \cdot HCl \cdot \frac{1}{2}C_2H_5OH$: C, 62.29; H, 6.97; N, 3.46. Found: C, 62.53; H, 7.09; N, 3.49.

Example 9.—Preparation of 1-(β-o-chlorophenoxyethyl)-6,7 - dimethoxy - 2 - methyl - 1,2,3,4 - tetrahydroisoquinoline hydrochloride

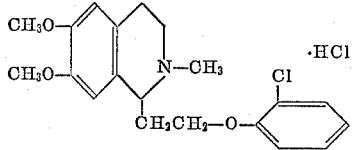

0.38 g. (0.0092 mole) sodium hydride
1.07 g. (0.0084 mole) o-chlorophenol
3.6 g. (0.0076 mole) [2,1-a]azetidino-6,7-dimethoxy-2-methyl - 1,2,3,4 - tetrahydroisoquinolinium p - bromobenzenesulfonate yielded 2.0 g. (66.7%) of 1-(β-o-chlorophenoxyethyl)-6,7 - dimethoxy - 2 - methyl - 1,2,3,4 - tetrahydroisoquinoline hydrochloride from 95% ethanol, M.P. 116.5–119.5° C.

*Analysis.*—Calc'd for $C_{20}H_{24}ClNO_3 \cdot HCl$: C, 60.30; H, 6.33; N, 3.52. Found: C, 59.94; H, 6.56; N, 3.41.

Example 10.—Preparation of 1 - (β - p - bromophenoxyethyl) - 6,7 - dimethoxy - 2 - methyl - 1,2,3,4 - tetrahydroisoquinoline hydrochloride

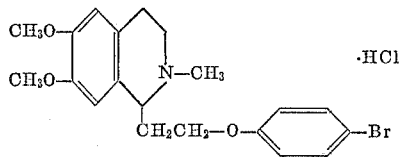

0.38 g. (0.0092 mole) sodium hydride
1.45 g. (0.0084 mole) p-bromophenol
3.6 g. (0.0076 mole) [2,1-a]azetidino-6,7-dimethoxy-2-methyl - 1,2,3,4 - tetrahydroisoquinolinium p - bromobenzenesulfonate yielded 2.0 g. (59%) of 1-(β-p-bromophenoxyethyl)-6,7-dimethoxy - 2 - methyl - 1,2,3,4 - tetrahydroisoquinoline hydrochloride from 95% ethanol, M.P. 179–189° C.

*Analysis.*—Calc'd for $C_{20}H_{24}BrNO_3 \cdot HCl$: C, 54.25; H, 5.69; N, 3.16. Found: C, 54.23; H, 5.78; N, 3.08.

Example 11.—Preparation of 1-(β-2,4-dichlorophenoxyethyl) - 6,7 - dimethoxy - 2 - methyl - 1,2,3,4 - tetrahydroisoquinoline hydrochloride hemihydrate

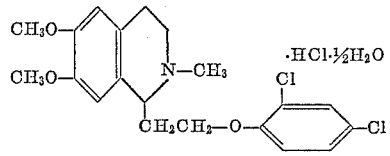

0.38 g. (0.0092 mole) sodium hydride
1.37 g. (0.0084 mole) 2,4-dichlorophenol
3.6 g. (0.0076 mole) [2,1-a]azetidino-6,7-dimethoxy-2-methyl - 1,2,3,4 - tetrahydroisoquinolinium p - bromobenzenesulfonate yielded 2.0 g. (61%) of 1-(β-2,4-dichlorophenoxyethyl)-6,7 - dimethoxy - 2 - methyl - 1,2,3,4 - tetrahydroisoquinoline hydrochloride hemihydrate from 95% ethanol, M.P. 146–149° C.

*Analysis.*—Cal'd for $C_{20}H_{23}Cl_2NO_3 \cdot HCl \cdot \frac{1}{2}H_2O$: C, 54.25; H, 5.69; N, 3.16; $H_2O$, 2.04. Found: C, 54.35; H, 5.62; N, 3.04; $H_2O$, 2.41.

Example 12.—Preparation of 6,7-dimethoxy-2-methyl-1(β - p - nitrophenoxyethyl) - 1,2,3,4 - tetrahydroisoquinoline hydrochloride

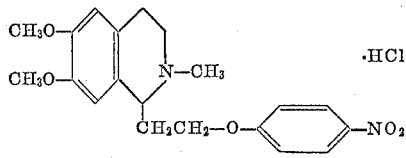

A solution of 1.35 g. (0.0084 mole) of sodium p-nitrophenoxide in 25 ml. dimethylformamide was treated with 3.6 g. (0.0076 mole) of [2,1-a]azetidino-6,7-dimethoxy-2 - methyl - 1,2,3,4 - tetrahydroisoquinolinium p - bromobenzenesulfonate and stirred at room temperature for 4 days. The solution was concentrated to dryness under vacuum. The residue was dissolved in water and extracted three times with ethyl acetate. These extracts were dried over anhydrous magnesium sulfate, filtered, and concentrated to give an oil which gave a crystalline hydrochloride from absolute ethanol. One recrystallization from 95% ethanol gave 1.8 g. (58%) of analytical material, M.P. 179–189° C.

*Analysis.*—Calc'd for $C_{20}H_{21}N_2O_5 \cdot HCl$: C, 58.74; H, 6.16; N, 6.85. Found: C, 58.72; H, 6.30; N, 6.61.

Example 13

When, in the procedure of Example 1, 3,4-dichlorophenol is replaced by an equal molar amount of 2-trifluoromethylphenol,
2-fluorophenol,
2-bromophenol,
4-methylphenol,
4-isopropylphenol,
2-methoxyphenol,
3,4-dimethoxyphenol,
2-hydroxypyridine,
4-hydroxypyridine,
2-hydroxythiazole,
2-hydroxythiophene,
3-hydroxythiophene,
2-chloro-3-hydroxythiophene,
3-chloro-2-hydroxythiophene,
4-chloro-2-hydroxythiazole,
5-trifluoromethyl-2-hydroxythiazole,
5-chloro-2-hydroxythiazole,
3-hydroxypyrrole,
2-hydroxypyrrole,
3-chloro-4-hydroxypyrrole,
2,6-dichloro-4-hydroxypiperidine,
4,5-dichloro-2-hydroxythiazole,
2,3-dichloro-4-hydroxythiophene, and
2,3-dichloro-4-hydroxypyrrole, there are obtained, 1-(β-2-trifluoromethylphenoxyethyl)-6,7-dimethoxy-2-methyl-1,2,3,4-tetrahydroisoquinoline hydrochloride,
1-(β-2-fluorophenoxyethyl)-6,7-dimethoxy-2-methyl-1,2,3,4-tetrahydroisoquinoline hydrochloride,
1-(β-2-bromophenoxyethyl)-6,7-dimethoxy-2-methyl-1,2,3,4-tetrahydroisoquinoline hydrochloride,
1-(β-4-methylphenoxyethyl)-6,7-dimethoxy-2-methyl-1,2,3,4-tetrahydroisoquinoline hydrochloride,
1-(β-4-isopropylphenoxyethyl)-6,7-dimethoxy-2-methyl-1,2,3,4-tetrahydroisoquinoline hydrochloride,
1-(β-2-methoxyphenoxyethyl)-6,7-dimethoxy-2-methyl-1,2,3,4-tetrahydroisoquinoline hydrochloride,
1-(β-3,4-dimethoxyphenoxyethyl)-6,7-dimethoxy-2-methyl-1,2,3,4-tetrahydroisoquinoline hydrochloride,
1-(β-2-pyridyloxyethyl)-6,7-dimethoxy-2-methyl-1,2,3,4-tetrahydroisoquinoline hydrochloride,
1-(β-4-pyridyloxyethyl)-6,7-dimethoxy-2-methyl-1,2,3,4-tetrahydroisoquinoline hydrochloride,
1-(β-2-thiazolyloxyethyl)-6,7-dimethoxy-2-methyl-1,2,3,4-tetrahydroisoquinoline hydrochloride,
1-(β-2-thienyloxyethyl)-6,7-dimethoxy-2-methyl-1,2,3,4-tetrahydroisoquinoline hydrochloride,
1-(β-3-thienyloxyethyl)-6,7-dimethoxy-2-methyl-1,2,3,4-tetrahydroisoquinoline hydrochloride,
1-(β-2-chloro-3-thienyloxyethyl)-6,7-dimethoxy-2-methyl-1,2,3,4-tetrahydroisoquinoline hydrochloride,
1-(β-3-chloro-2-thienyloxyethyl)-6,7-dimethoxy-2-methyl-1,2,3,4-tetrahydroisoquinoline hydrochloride,
1-(β-4-chloro-2-thiazolyloxyethyl)-6,7-dimethoxy-2-methyl-1,2,3,4-tetrahydroisoquinoline hydrochloride,
1-(β-5-trifluoromethyl-2-thiazolyloxyethyl)-6,7-dimethoxy-2-methyl-1,2,3,4-tetrahydroisoquinoline hydrochloride,
1-(β-5-chloro-2-thiazolyloxyethyl)-6,7-dimethoxy-2-methyl-1,2,3,4-tetrahydroisoquinoline hydrochloride,
1-(β-3-pyrrolyloxyethyl)-6,7-dimethoxy-2-methyl-1,2,3,4-tetrahydroisoquinoline hydrochloride,
1-(β-2-pyrrolyloxyethyl)-6,7-dimethoxy-2-methyl-1,2,3,4-tetrahydroisoquinoline hydrochloride,
1-(β-3-chloro-4-pyrrolyloxyethyl)-6,7-dimethoxy-2-methyl-1,2,3,4-tetrahydroisoquinoline hydrochloride,
1-(β-2,6-dichloro-4-pyridyloxyethyl)-6,7-dimethoxy-2-methyl-1,2,3,4-tetrahydroisoquinoline hydrochloride,
1-(β-4,5-dichloro-2-thiazolyloxyethyl)-6,7-dimethoxy-2-methyl-1,2,3,4-tetrahydroisoquinoline hydrochloride,
1-(β-2,3-dichloro-4-thienyloxyethyl)-6,7-dimethoxy-2-methyl-1,2,3,4-tetrahydroisoquinoline hydrochloride and
1-(β-2,3-dichloro-4-pyrrolyloxyethyl)-6,7-dimethoxy-2-methyl-1,2,3,4-tetrahydroisoquinoline hydrochloride, respectively.

The compounds of the present invention contain an asymmetric carbon atom, and thus normally occur as a racemic mixture of the two optical isomers. Both isomers and mixtures thereof are included within the scope of the present invention. The individual isomers are prepared in pure form by first resolving the intermediate of the formula

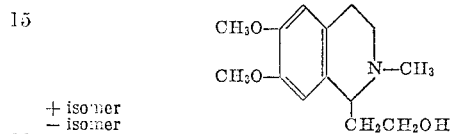

with an optically active acid, e.g., dextro-rotatory substituted tartranilic acids having the formula

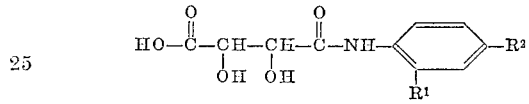

wherein $R^1$ is hydrogen, chloro, bromo or nitro and $R^2$ is hydrogen, chloro or bromo, but $R^1$ and $R^2$ are not each hydrogen and preferably those having the formulae

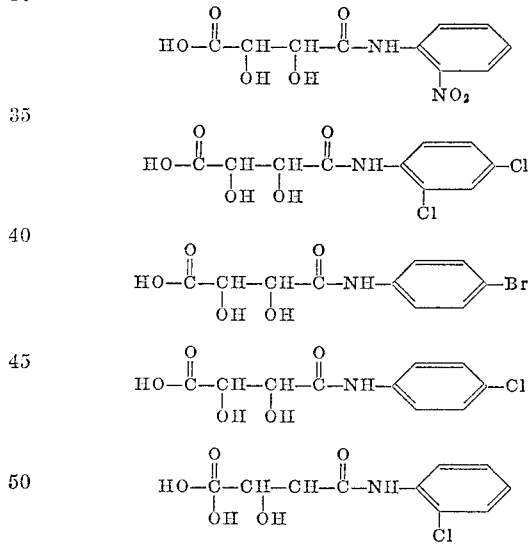

and then reacting the resolved intermediates according to the method previously described herein.

The dextro-rotatory substituted tartranilic acids resolving agents are prepared by the consecutive steps of:

(a) Heating a mixture of (+)-2,3-diacetyl-succinic anhydride or its functional equivalent as an acylating agent for primary amines and an aniline, and preferably a substituted aniline having the formula

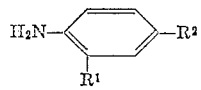

wherein $R^1$ and $R^2$ have the meaning set out above, to produce the corresponding diacetyl-tartranilic acid, and (b) Deacetylating said diacetyl-tartranilic acid by treatment with alkali to produce the desired dextro-rotatory tartranilic acid.

The resolution of the 6,7-dimethoxy-1-β-hydroxyethyl-2-methyl-1,2,3,4-tetrahydroisoquinoline described above comprises:

(a) Forming a mixture of the two enantiomeric salts of said amine with a dextro-rotatory ring-substituted tartranilic acid, said substituent comprising preferably at least one nitro, chloro or bromo group, (b) Separating said enantiomeric salts by fractional crystallization and then (c) Converting said separated enantiomeric salts to the respective optical isomers of the organic amine, preferably by treatment with a strong base.

The (+)-2,3-diacetylsuccinic anhydride used as a starting material is prepared according to Organic Syntheses, Collected Volume IV, page 242, Wiley (1963) or preferably as exemplified below. It is apparent that it can be replaced by the corresponding mono-acid halides or mono-mixed anhydrides and other functional equivalents for the acylation of anilines.

The following examples are given to illustrate the preparation of the resolving agents and the preparation of the optical isomers of the compounds of this invention. All temperatures are given in degrees centigrade.

PREPARATION OF RESOLVING AGENTS

Example 1

(+) - 2' - nitrotartranilic acid.—(+)-2,3-diacetylsuccinic anhydride (44 g., 0.2 mole) and 2-nitroaniline (35 g., 0.25 mole) were placed with 300 ml. methylene chloride and heated under reflux for 3½ hours. This solution was cooled to room temperature and treated dropwise with stirring with a solution of 39 g. potassium hydroxide (86% pellets; 0.6 mole) in 400 ml. water. This was stirred one hour at room temperature. The layers were separated and the methylene chloride layer was extracted with 100 ml. more water. The combined aqueous layers were heated on a steam bath, treated with decolorizing carbon, filtered hot through diatomaceous earth ("Celite"), acidified with 50 ml. concentrated hydrochloric acid and cooled at 5° overnight. The crystals were collected and washed with 100 ml. cold water to yield 32 g. yellow crystals. This material was taken up in 300 ml. hot water, treated with 15 ml. concentrated hydrochloric acid and cooled. Collection of the crystals gave 28 g. (52%) of 2'-nitrotartranilic acid. A sample was recrystallized from n-propanol for analysis, M.P. 196.0–198.0°, $[\alpha]_D^{25}$ +71.3° (c.=2.5, ethanol), $[\alpha]_D^{25}$ +89.8° (c.=0.83, $H_2O$).

Analysis.—Calc'd for $C_{10}H_{10}N_2O_7$: C, 44.45; H, 3.73; N, 10.37. Found: C, 44.41; H, 3.79; N, 10.31.

Example 2

(+) - 2,4 - dichlorotartranilic acid.—(+)-2,3-diacetylsuccinic anhydride (22 g., 0.1 mole) and 2,4-dichloroaniline (18 g., 0.11 mole) in 150 ml. methylene chloride were stirred together for two hours. A solution of 21 g. potassium hydroxide (87% pellets; 0.32 mole) in 200 ml. water was added and the two-phase system stirred vigorously for one hour. The methylene chloride layer was separated, extracted with 100 ml. water and discarded. The combined aqueous extracts were warmed on a steam bath, filtered, acidified with 35 ml. concentrated hydrochloric acid and cooled for crystallization. Collection of this material gave 17 g. (59%) colorless (+)-2',4'-dichlorotartranilic acid. Several crystallizations from water gave an analytical sample, M.P. 182.5–192.5°, $[\alpha]_D^{25}$ +100.7° (c.=1.6, 95% ethanol).

Analysis.—Calc'd for $C_{10}H_9NO_5$: C, 40.84; H, 3.08; N, 4.76. Found: C, 40.84; H, 3.21; N, 4.57.

Example 3

(+)-2,3-diacetoxysuccinic anhydride.—A mixture of (+) tartaric acid (150 g., 1 mole) in 700 ml. acetic anhydride was warmed with stirring until the exothermic reaction started. Heating was discontinued and the reaction was allowed to run its course (about 2–3 hours). The colorless solution was concentrated to dryness at reduced pressure. Final drying under high vacuum gave a quantitative yield of (+)-2,3-diacetoxysuccinic anhydride (216 g.) of good purity. This material may be recrystallized from ethyl acetate—"Skellysolve B" if better purity is desired. Recrystallized material has a melting point of 133.0–133.5° and $[\alpha]_D^{25}$ +60.5° (c.=6.2 acetone).

Substituted tartranic acids V (a–c).—(+) - 2,3 - diacetoxysuccinic anhydride (21.6 g., 0.1 mole) and substituted aniline (0.11 mole) in 200 ml. of methylene chloride were heated under reflux for 3 hours. This solution was treated with a solution of potassium hydroxide (21 g. of 86% potassium hydroxide pellets; 0.32 mole) in 200 ml. water and stirred vigorously for 15 minutes. The methylene chloride layer was separated and extracted with 100 ml. water. The combined aqueous layers were stirred for 2 hours, then warmed to solution, treated with decolorizing carbon (if necessary), filtered through diatomaceous earth ("Celite"), acidified with 35 ml. concentrated hydrochloric acid and cooled immediately for crystallization. The crystals were collected, washed with water, and then recrystallized from the indicated solvent.

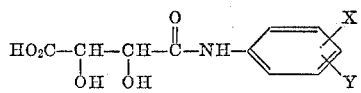

| X,Y | | Cryst. solvent | $[\alpha]_D^{25}$(c)[1] | V(a–e), M.P., °C. | Yield, percent |
|---|---|---|---|---|---|
| Va | 2-$NO_2$ | $H_2O$ (HCl)[2] | +89.8° (0.8, $H_2O$) | 196.0–198.0 | 50 |
| Vb | 2,4-di Cl | $H_2O$ or HOAc[3] | +100.7° (1.6) | 182.5–192.5 | 59 |
| Vc | 2-Cl | $H_2O$ | +99.4° (1.6) | 180.5–182.5 | 47 |
| Vd | 4-Cl | Ethanol-$H_2O$ | +108.9° (1.6) | 193.0–195.0 | 85 |
| Ve | 4-Br (hydrate) | Ethanol-$H_2O$ | +90.5° (1.8) | 198.5–201.5 | 67 |

[1] Unless otherwise indicated rotations were taken in 95% ethanol.
[2] This material sometimes crystallizes containing ~25% potassium salt. Recrystallization from dilute HCl converts to 100% acid.
[3] This material tends to form a gel on recrystallization. It is recommended that it not be recrystallized.

Example 4

(+) - 2' - chlorotartranilic acid.—(+)-2,3 - diacetoxysuccinic anhydride (21.6 g., 0.1 mole) and 2-chloroaniline (12.8 g., 0.1 mole) in 100 ml. of methylene chloride were heated under reflux for one hour. This solution was treated with a solution of potassium hydroxide (22 g., 86% pellets; 0.32 mole) and the methylene chloride was removed under reduced pressure. The remaining aqueous solution was heated on a steam bath 20 minutes, filtered hot, acidified with 35 ml. concentrated hydrochloric acid and cooled to yield 12.1 g. (47%) crystalline (+)-2'-chlorotartranilic acid. Recrystallization from water gave analytical material, M.P. 180.5–182.5°, $[\alpha]_D^{25}$ +99.4 (c.=1.65, 95% ethanol).

Analysis.—Calc'd for $C_{10}H_{10}ClNO_5$: C, 46.26; H, 3.88; N, 5.40. Found: C, 46.22; H, 3.48; N, 5.32.

Example 5

(+)-4'-chlorotartranilic acid.—(+) - 2,3 - diacetoxysuccinic anhydride (22 g., 0.1 mole) and 4-chloroaniline (15 g., 0.12 mole) in 150 ml. methylene chloride were stirred together for one hour. This solution was treated with a solution of potassium hydroxide (21 g., 86% pellets, 0.32 mole) in 50 ml. water. This two-phase system was stirred vigorously for one hour. The layers were separated and the organic layer extracted with 100 ml. water. The combined aqueous layers were heated to drive off any residual methylene chloride, filtered and acidified with 30 ml. concentrate hydrochloric acid. After cooling, the crystals were collected to give 24.2 g. (90%) (+)-4′-chlorotartranilic acid. Recrystallization twice from 3:1 water:ethanol gave an analytical sample, M.P. 193.0–195.0°, $[\alpha]_D^{25}$ +108.9° (c.=1.64, 95% ethanol).

Analysis.—Calcd for $C_{10}H_{10}ClNO_5$: C, 46.26; H, 3.88; N, 5.40. Found: C, 46.65, 46.62; H, 4.04, 4.05; N, 5.34.

Example 6

(+)-4′-bromotartranilic acid hydrate.—(+)-2,3 - diacetoxysuccinic anhydride (21.6 g., 0.1 mole) and 4-bromoaniline (17.2 g., 0.1 mole) were placed with 200 ml. methylene chloride and heated under reflux for 3 hours. This solution was treated with a solution of potassium hydroxide (21 g., 86% pellets, 0.32 mole) in 200 ml. water and stirred vigorously for ten minutes. The methylene chloride layer was separated and extracted with 100 ml. water. The combined aqueous layers were stirred for two hours, warmed, filtered and acidified to give 20.5 g. (67%) crystalline (+)-4′-bromotartranilic acid hydrate. This was recrystallized from ethanol-water with a decolorizing carbon treatment to give 15 g. analytically pure (+)-4′-bromotartranilic acid hydrate, M.P. 198.5–201.5°, $[\alpha]_D^{25}$ +90.5° (c.=1.8, 95% ethanol).

Analysis.—Calcd for $C_{10}H_{10}BrNO_5 \cdot H_2O$: C, 37.28; H, 3.76; N, 4.35; $H_2O$, 5.59. Found: C, 37.07; H, 3.61; N, 4.32; $H_2O$, 5.68.

Example 7.—Resolution of (±) - 6,7 - dimethoxy - 1 - β-hydroxyethyl-2-methyl-1,2,3,4-tetrahydroisoquinoline

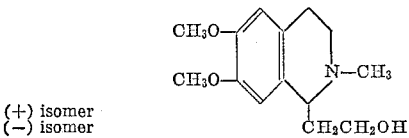

(+) isomer
(−) isomer

To a warm solution of 73.1 g. (0.292 mole) of (±)-6,7-dimethoxy-1-β-hydroxyethyl - 2 - methyl-1,2,3,4-tetrahydroisoquinoline in 375 ml. of 95% ethanol was added a warm solution of 39.4 g. (0.146 mole) of (+)-2′-nitrotartranilic acid in 375 ml. of 95% ethanol. The crystals (75.9 g.) were collected after storage at 5° C. for 20 hours. One recrystallization from 750 ml. of 80% ethanol gave 69.8 g. (92%) of material, M.P. 193.5–195.5°.

This material was converted to its free base by neutralization with aqueous sodium carbonate and extraction with ethyl acetate. Concentration of the ethyl acetate extracts gave 30.0 g. of oil. This oil gave a crystalline hydrochloride from isopropanol and 10 ml. of concentrated hydrochloric acid. One recrystallization from 150 ml. of absolute ethanol gave 22.3 g. (55%) of (+)-6,7-dimethoxy-1-β-hydroxyethyl - 2 - methyl-1,2,3,4-tetrahydroisoquinoline hydrochloride, M.P. 177–180° $[\alpha]_D^{25}$ +22.7° (c.=2.05, chloroform).

Analysis.—Calc'd for $C_{14}H_{21}NO_3 \cdot HCl$: C, 58.43; H, 7.71; N, 4.87. Found: C, 58.67; H, 7.81; N, 4.63.

The mother liquor from the original crystallization was concentrated to ⅕ its original volume, and treated with 1.0 g. (+)-2-nitrotartranilic acid in 25 ml. of 95% ethanol. The solution was concentrated to dryness and the resultant oil taken up in ethyl acetate, filtered, washed wtih aqueous sodium carbonate, dried over anhydrous sodium sulfate, and concentrated to dryness to give 33.6 g. of an oil. This oil gave a crystalline hydrochloride from acetone-dry hydrogen chloride. One recrystallization from 95% ethanol gave 24.4 g. (60%) of (−)-6,7-dimethoxy-1-β-hydroxyethyl - 2 - methyl-1,2,3,4-tetrahydroisoquinoline hydrochloride, M.P. 177–179°, $[\alpha]_D^{25}$ −22.8° (c.=2.02, chloroform).

Analysis.—Calc'd for $C_{14}H_{21}NO_3 \cdot HCl$: C, 58.43; H, 7.71; N, 4.87. Found: C, 58.41; H, 7.81; N, 4.67.

Example 8

(−)-[2,1 - a]azetidino - 6,7 - dimethoxy - 2 - methyl-1,2,3,4 - tetrahydroisoquinolinium - p - bromobenzenesulfonate.—(+) - 6,7 - dimethoxy - 2 - methyl - 1,2,3,4-tetrahydroisoquinoline hydrochloride (23.8 g., 0.083 mole) was converted to its free base by neutralization with sodium carbonate and extraction with 200 ml. chloroform. The chloroform extract was dried over sodium sulfate and filtered. This solution was then treated with 23.2 g. (0.091 mole) of p-bromobenzene sulfonyl chloride and stirred for four hours at room temperature. Anhydrous sodium carbonate (44 g.) was then added and stirring was continued sixteen hours. The reaction mixture was filtered and the filtrate concentrated to give 38 g. of crude crystalline material. One recrystallization from isopropanol gave 26.8 g. (69%) of analytical material, M.P. 178–180°, $[\alpha]_D^{25}$ −115.7° (c.=2.02, chloroform).

Analysis.—Calc'd for $C_{20}H_{24}BrNO_5S$: C, 51.07; H, 5.14; N, 2.98. Found: C, 51.24; H, 5.24; N, 2.85.

Example 9

(+)-[2,1-a] azetidino-6,7-dimethoxy-2-methyl-1,2,3,4-tetrahydroisoquinolinium - p - bromobenzenesulfonate.—(−)-6,7 - dimethoxy - 2 - methyl - 1,2,3,4-tetrahydroisoquinoline hydrochloride (22.6 g., 0.079 mole) was converted to its free base by neutralization with sodium carbonate and extraction with 200 ml. chloroform. The chloroform extract was dried over sodium sulfate and filtered. This solution was then treated with 21.8 g. (0.085 mole) of p-bromobenzenesulfonyl chloride and stirred for four hours at room temperature. Anhydrous sodium carbonate (41.5 g.) was added and stirring was continued for sixteen hours. The reaction mixture was filtered and the filtrate concentrated to give 39 g. of crude crystalline material. One recrystallization from isopropanol gave 26.0 g. (70.3%) of analytical material, M.P. 179.5–180.5°, $[\alpha]_D^{25}$ +114.2° (c.=2.00 chloroform).

Analysis.—Calc'd for $C_{20}H_{24}BrNO_5S$: C, 51.07; H, 5.14; N, 2.98. Found: C, 51.11; H, 5.12; N, 2.75.

Example 10

(S)-1-(β-3,4-dichlorophenoxyethyl)-6,7 - dimethoxy-2-methyl - 1,2,3,4 - tetrahydroisoquinoline hydrochloride.—To a stirred solution of 1.37 g. (0.0084 mole) 3,4-dichlorophenol in 25 ml. of dried dimethylformamide maintained in a nitrogen atmosphere was added 0.38 g. (0.0092 mole) of a 58.6% dispersion of sodium hydride in mineral oil. After stirring for 15 minutes, 3.6 g. (0.0076 mole) of (−)-[2,1-a]azetidino-6,7 - dimethoxy - 2 - methyl-1,2,3,4,-tetrahydroisoquinolinium p-bromobenzenesulfonate was added. Stirring at room temperature was continued for twenty hours. This solution was concentrated to dryness under vacuum. The residue was dissolved in water and extracted three times with ethyl acetate. These extracts were dried over anhydrous magnesium sulfate, filtered, and concentrated to give an oil. This oil was taken up in acetonitrile, washed with n-pentane to remove mineral oil, and concentrated to give 3.0 g. of a clear oil which gave a crystalline hydrochloride from acetone-dry hydrogen chloride. One recrystallization from isopropanol yielded the product, (S)-1-(β-3,4-dichlorophenoxyethyl)-6,7-dimethoxy-2-methyl-1,2,3,4 - tetrahydroisoquinoline hydrochloride.

This is the (S)— isomer in the nomenclature of Cahn, Ingold and Prelog, Experientia, XII (3), 81–94 (Mar. 15, 1956).

Example 11

(R) - 1 - (β-3,4-dichlorophenoxyethyl)-6,7-dimethoxy-2 - methyl-1,2,3,4-tetrahydroisoquinoline hydrochloride.—To a stirred solution of 1.37 g. (0.0084 mole) 3,4-dichlorophenol in 25 ml. of dried dimethylformamide maintained in a nitrogen atmosphere was added 0.38 g. (0.0092 mole) of a 58.6% dispersion of sodium hydride in mineral oil. After stirring for 15 minutes, 3.6 g. (0.0076 mole) of (+)-[2,1-a]azetidino - 6,7 - dimethoxy-2-methyl-1,2,3,4-tetrahydroisoquinolinium p-bromobenzenesulfonate was added. Stirring at room temperature was continued for twenty hours. This solution was concentrated to dryness under vacuum. The residue was dissolved in water and extracted three times with ethyl acetate. These extracts were dried over anhydrous magnesium sulfate, filtered, and concentrated to give an oil. This oil was taken up in acetonitrile, washed with n-pentane to remove mineral oil, and concentrated to give 3.0 g. of a clear oil which gave a crystalline hydrochloride from acetone-dry hydrogen chloride. One recrystallization from isopropanol yielded the product, (R) - 1 - (β-3,4-dichlorophenoxyethyl)-6,7-dimethoxy - 2 - methyl-1,2,3,4-tetrahydroisoquinoline hydrochloride.

This is the (R)—isomer. All or virtually all of the analgesic activity resides in this (R)— isomer, whether it is in the form of the free base or an acid addition salt.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The compounds of this invention when administered orally or parenterally in an effective amount are effective in the treatment of pain.

While this invention has been described and exemplified in terms of its preferred embodiment, those skilled in the art will appreciate that modifications can be made without departing from the spirit and scope of the invention.

I claim:
1. A member selected from the group consisting of compounds of the formula

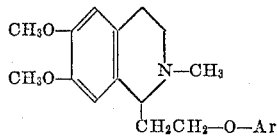

wherein Ar is a member selected from the group consisting of

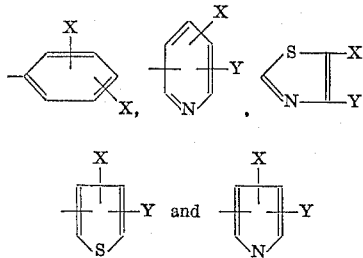

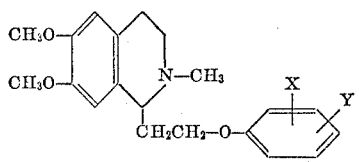

wherein X and Y are each a member selected from the group consisting of hydrogen, chloro, bromo, fluoro, trifluoromethyl, methyl, ethyl, methoxy and ethoxy; and nontoxic pharmaceutically acceptable acid addition salts thereof.

2. A compound of claim 1 having the formula

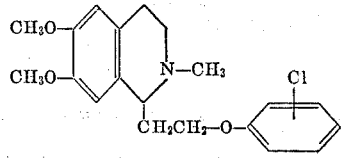

wherein X and Y are each a member selected from the group consisting of hydrogen, chloro, bromo, fluoro, trifluoromethyl, methyl, ethyl, methoxy and ethoxy and nontoxic pharmaceutically acceptable acid addition salts thereof.

3. A compound of claim 1 having the formula

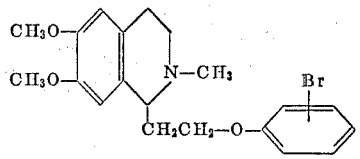

and nontoxic pharmaceutically acceptable acid addition salts thereof.

4. A compound of claim 1 having the formula

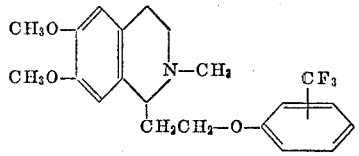

and nontoxic pharmaceutically acceptable acid addition salts thereof.

5. A compound of claim 1 having the formula

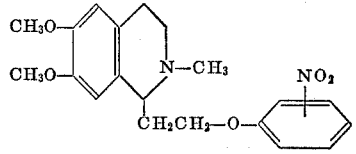

and nontoxic pharmaceutically acceptable acid addition salts thereof.

6. A compound of claim 1 having the formula

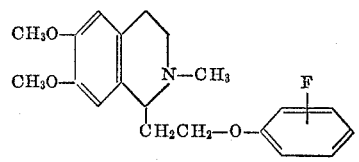

and nontoxic pharmaceutically acceptable acid addition salts thereof.

7. A compound of claim 1 having the formula

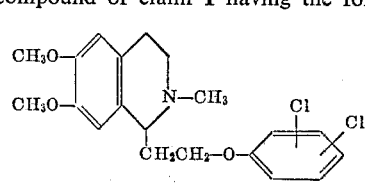

and nontoxic pharmaceutically acceptable acid addition salts thereof.

8. A compound of claim 1 having the formula

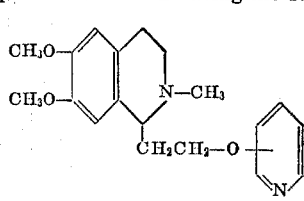

and nontoxic pharmaceutically acceptable acid addition salts thereof.

9. A compound of claim 1 having the formula

10. The compound of claim 1 having the formula

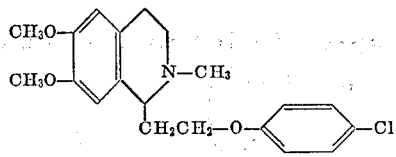

and nontoxic pharmaceutically acceptable acid addition salts thereof.

11. The compound of claim 1 having the formula

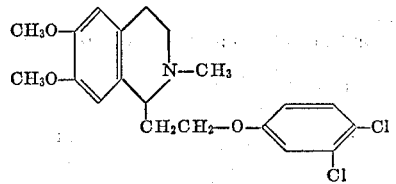

and nontoxic pharmaceutically acceptable acid addition salts thereof.

12. The (R) isomer of the compound of claim 11.

References Cited

UNITED STATES PATENTS 2,785,166  3/1957  Cusic _____ 260—288
3,042,671  7/1962  Lombardine et al.

NICHOLAS S. RIZZO, *Primary Examiner.*

D. G. DAUS, *Assistant Examiner.*